Figure 1:
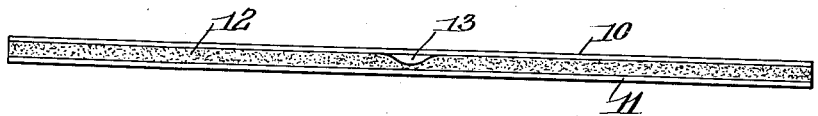

Nov. 15, 1932.　　　F. W. HARNEY　　　1,887,759

METHOD FOR MAKING PRODUCTS FROM PLASTIC MATERIAL

Original Filed March 11, 1931

INVENTOR
Francis W. Harney
BY Edward Cumpston
his ATTORNEY

Patented Nov. 15, 1932

1,887,759

UNITED STATES PATENT OFFICE

FRANCIS W. HARNEY, OF LOCKPORT, NEW YORK, ASSIGNOR TO THE UPSON COMPANY, OF LOCKPORT, NEW YORK, A CORPORATION OF NEW YORK

METHOD FOR MAKING PRODUCTS FROM PLASTIC MATERIAL

Original application filed March 11, 1931, Serial No. 521,772. Divided and this application filed May 6, 1932. Serial No. 609,640.

This invention relates to a method of making articles from plastic material, such for example as the making of wallboard from a plastic mass placed between two liner sheets and hardened to form an intumescent porous cellular body.

An object of the invention is the provision of a generally improved method which is more satisfactory than those previously known, for the making of such materials.

Another object of the invention is the provision of a method which is particularly satisfactory in the making of relatively wide pieces or strips of material.

Still another object is the provision of a method especially adapted for the manufacture of wallboard by a substantially continuous process, by which method satisfactory wallboard may be made of relatively great width.

To these and other ends the invention resides in certain improvements and combinations of parts, all as will be hereinafter more fully described, the novel features being pointed out in the claims at the end of the specification.

Figure 2:
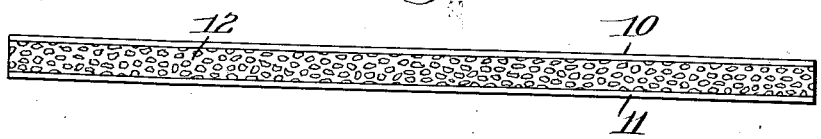

In the drawing:

Fig. 1 is a diagrammatic cross section through a wallboard at an intermediate stage of its manufacture according to the present method, and Fig. 2 is a diagrammatic cross section through the same board after it has been completed.

The same reference numerals throughout the several views indicate the same parts.

This application is a division of my application for apparatus for making products from plastic material, Serial No. 521,772, filed March 11, 1931. The present case is intended to claim the method disclosed in said prior application, while the claims of the prior application will be limited to the machine for carrying out the method, the machine being fully disclosed in said prior application.

The method of the present invention relates to the manufacture of various articles from plastic material and will be described with particular reference to the manufacture of wallboard, although it is to be understood that other articles or products in addition to wallboard may also be made.

According to the present method, plastic material is placed as a filling or core between two liner sheets, and the composite structure of filling and liner sheets is then subjected to heat. Plastic fillings of a kind suitable in this connection ordinarily contain vaporizable substances, such as moisture which will form steam upon heating.

The formation of the vapor during the step of heating creates internal pressures in the product which tend to distort it by forcing the liner sheets away from each other, splitting the core or filling. In some instances, and especially when the product is being made in relatively narrow widths such as four feet, for example, the internal pressures formed in this way are found to be not greatly detrimental, and can be controlled to a sufficient extent, as for example by confining the material between platens during part of the heating operation.

When the material is made in relatively great widths, such for example as widths of eight feet, it is found that there is a considerable tendency for the liners to be distorted or forced away from each other, and the distorting tendency is so great that it cannot be satisfactorily controlled by the methods which have heretofore been used in making a narrow product. Even if platens are used to confine the product during heating, the liners will be forced away from each other to some extent after the product emerges from the platens (unless the platens are of excessive and uneconomical size or length), so that the resulting product is imperfect and in many cases entirely useless.

The exact cause of this phenomenon in the manufacture of a wide product is not known with certainty, although it seems probable that it is due to the internal pressure developed by vaporization of moisture in the plastic filling. It also seems probable that the reason this is so much more pronounced in the case of a wide product than in the case of a narrow product, is that the vapor causing the pressure can escape only with considerably more difficulty, because it must force its way through a much greater distance of plastic material from a point near the center of the product to the exposed edge thereof than when the material is substantially narrower. At any rate, whatever the exact cause may be, it is a fact that in actual use the liners are forced apart after leaving the platens and a considerable proportion of the product is spoiled when it is attempted to produce a relatively wide product at economical speeds.

According to the method of the present invention, this unsatisfactory condition of the product is obviated and a satisfactory product is produced economically notwithstanding the relatively great width thereof. The present method contemplates the provision of one or more expansion chambers or cavities in the filling at intermediate points in the width of the product. When only one such cavity is used, it is preferably substantially at the center of the product in a transverse direction. This expansion chamber or cavity may be formed, for example, by preventing or blocking off the supply of plastic filling to the space between the liner sheets at a desired intermediate point in the width of the product, so that no filling or at least less than the normal amount of filling is deposited between the liners at the desired intermediate point. This is illustrated in Fig. 1 of the accompanying drawing, showing an upper liner sheet 10, a lower liner sheet 11, a plastic filling or core 12, and a cavity 13 in the filling substantially at the center of the sheet in a transverse direction.

It is found that when this cavity is provided, according to the present invention, the above described distortion or splitting of the product does not occur. The exact reasons for this improved result are not known with certainty, but it seems probable that the expansion cavity 13 provides a chamber into which the vapor under pressure can flow to some extent, and from which it can escape through the somewhat porous liner sheets more readily than at points where the filling is in close contact with the liner sheets. Furthermore, the cavity forms an expansion chamber into which some of the filling may expand during the heating operation.

Whatever the exact reasons for the improved result may be, the fact is that actual use has demonstrated that when the method of this invention is used, the product does not become distorted and the liners are not forced away from each other after the product emerges from the platens, even when operating at economical commercial speeds. Furthermore, when the heat treatment is finished, the cavity originally left in the filling is found to be completely filled up by expansion of filling thereinto, so that there is no cavity present which might form any defect in the product.

Preferably the filling employed according to the present invention not only is plastic, but also is intumescent. For example, it may comprise a mixture of sodium silicate and a finely ground inorganic filler such as limestone or dolomite. Such a mixture is initially introduced between the liner sheets when it is of a somewhat dough-like consistency. Subsequent heating of the product causes this mixture to intumesce so that it becomes porous or filled with a multitude of relatively small cells, somewhat comparable in size and appearance to the cells of a loaf of bread. Continued heating hardens and sets the product so that it finally becomes rigid, strong, and water resistant, having a hardness comparable to that of stone. Fig. 2 illustrates a cross section through the product after the heat treatment thereof is finished, and illustrates diagrammatically not only the cellular nature of the filling or core when completed, but also shows, by comparison with Fig. 1, that the intumescent filling expands so that the core of the final product is substantially thicker than the layer of filling originally introduced between the liners. Fig. 2 also shows that the expansion cavity 13 disappears substantially completely during the intumescing operation by flow of part of the filling thereinto.

By using the method of the present invention, wallboard having paper liners and an intumescing filling of sodium silicate and ground limestone has been satisfactorily constructed in widths as great as eight feet, whereas without the use of the present method the attempt to produce wallboard of these materials in this width was frequently unsuccessful and resulted in a considerable proportion of board which became deformed after emerging from the platens.

When a product is made according to prior methods, without using the expansion cavity of the present invention, it is found that a strip of wallboard eight feet wide is frequently as much as fifty or sixty thousandths of an inch thicker near the center of the board than near the edges thereof, notwithstanding the fact that the filling material was originally distributed uniformly between the liners. A variation in thickness or "caliper" of this magnitude is often a serious defect. When the expansion cavity of the present invention is employed, however, it is found that the variation in caliper between the center and edges of an eight foot board does not exceed about ten or twelve thousandths of an inch, which is a great reduction from the previous variation of fifty or sixty thousandths. Also, when using the present invention the frictional resistance to moving the board through the platens is found to be materially less than previously, the board runs through the platens more smoothly, and the cellular structure of the board is greatly improved, the cells being smaller and more uniformly distributed, and the board being considerably stronger than similar boards made without the use of the present invention.

While the liner sheets, especially in the case of wallboard, are preferably permanently retained on the filling or core, this is not essential under all circumstances and it is contemplated that the invention may be used also in making a product which in its final form has no or only one liner sheet. Hence the words "liner sheet" and "liner" as used in this specification and in the accompanying claims are intended to include any sheet material used on either side of the filling, whether such use is permanent or temporary. For example, if the liners are to remain permanently attached to the filling, they may be of heavy paper, cloth, or other suitable material. If one or both liners are to be later removed from the filling, one or both of them may be formed from paper which is waxed or oiled to prevent it from sticking permanently to the filling, or of a strip or piece of metal which is greased or oiled likewise to prevent it from sticking permanently, and such liners may be stripped from the filling or core after emerging from the platens.

In carrying out the present method, the liners are preferably led over and between forming rolls, and the plastic filling is supplied by a hopper and introduced between the liners as they pass between the forming rolls, in the general manner disclosed in Upson Patent No. 1,854,872, granted April 19, 1932. Supply of plastic material to the space between the liners is wholly or partially blocked off at one or more intermediate points in the width of the product. The liners are moved preferably continuously through the forming rolls and then between heated platens or the like, to heat the plastic filling and cause intumescence thereof. Thus the product may be produced continuously, and the continuous strip may be cut up into suitable lengths or sizes as desired.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. The method of making material comprising liner sheets and an intumescent filling between the liner sheets, which comprises introducing an intumescent filling into a part only of the space between liner sheets, providing a pressure-relieving cavity at an intermediate point in such space, and subjecting the liner sheets and filling to heat to cause said filling to intumesce.

2. The method of making wallboard which comprises introducing an intumescent filling into a part only of the space between two liner sheets, providing a pressure-relieving cavity at an intermediate point in such space, and subjecting the liner sheets and filling to heat to cause said filling to intumesce.

3. The method of making wallboard which comprises placing an intumescent filling between two liner sheets, less quantity of filling per unit of surface area of the wallboard being placed at one intermediate point than at other points, and subjecting the filling to heat to cause it to intumesce, so that the filling will tend to flow partially toward the point where less filling was placed.

4. The method of making wallboard which comprises introducing a predetermined thickness of intumescent filling between two moving liner sheets throughout certain portions of the width of said sheets while placing substantially less filling between said sheets at an intermediate point in the width thereof to provide a pressure-relieving cavity running longitudinally in said filling, and subjecting the filling to heat to cause it to intumesce.

5. The method of making wallboard which comprises moving two liner sheets substantially continuously through adjacent paths of travel, introducing an intumescent filling including sodium silicate and finely divided inorganic material between said liner sheets at one point in their paths of travel in such manner that a pressure-relieving cavity is provided at a point inwardly of the edges of said sheets, and subsequently confining said liner sheets and filling between heated platens at another point in their paths of travel to cause said filling to intumesce, pressure caused thereby being partially relieved by flow of filler toward said cavity.

6. The method of making products from plastic material which comprises bringing two liner sheets into proximity to each other with a space between them, inserting a plastic filling in said space throughout the major portion of the width of the assembled sheets while substantially excluding filling from said space at an intermediate point in the width of the sheets, and subjecting said filling and sheets to heat.

7. The method of making products from plastic material which comprises bringing two liner sheets into proximity to each other with a space between them, causing plastic filling to flow into said space throughout the major portion of the width of the assembled sheets while substantially blocking off flow of filling into said space at one or more intermediate points in the width of the sheets to provide one or more pressure-relieving cavities, and subjecting said filling and sheets to heat.

8. The method of making products from plastic material which comprises moving two strips of sheet material substantially continuously between two spaced rolls, inserting plastic material between said strips substantially as they pass between said rollers and throughout the major portion of the width of said strips while omitting plastic material at a predetermined point in the width of said strips to create a pressure-relieving cavity in the plastic material running longitudinally of the strips at an intermediate point in the width thereof, and subjecting said strips and filling to heat.

9. The continuous method of making a product from plastic material which comprises moving two strips of sheet material substantially continuously between two spaced rollers, inserting plastic material between said strips substantially as they pass between said rollers and throughout the major portion of the width of said strips while substantially omitting plastic material at a predetermined point in the width of said strips to create a pressure-relieving cavity in the plastic material running longitudinally of the strips at an intermediate point in the width thereof, and moving said strips and filling substantially continuously to and between heated platens to confine and heat said filling.

10. The method of making wallboard which comprises moving two strips of sheet material substantially continuously between two spaced rollers, inserting an intumescent plastic filling between said strips substantially as they pass between said rollers and throughout the major portion of the width of said strips while omitting said filling at a predetermined point in the width of said strips to create a pressure-relieving cavity in the filling running longitudinally of the strips at an intermediate point in the width thereof, and moving said filled strips substantially continuously between heated platens.

FRANCIS W. HARNEY.